O. F. EVANS.
Wagon Brake.
No. 88,859. Patented April 13, 1869.
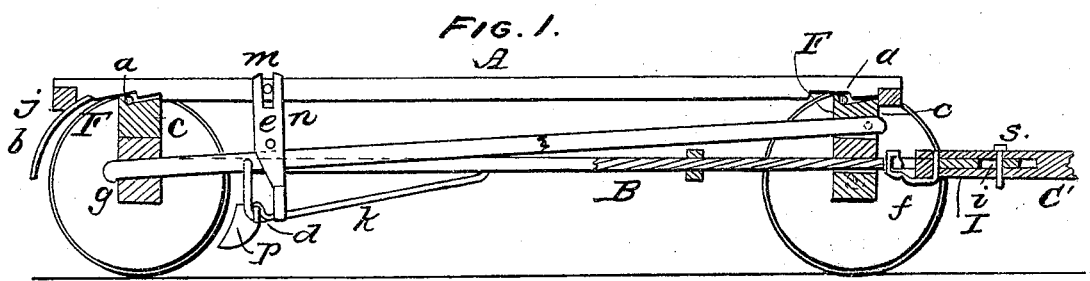
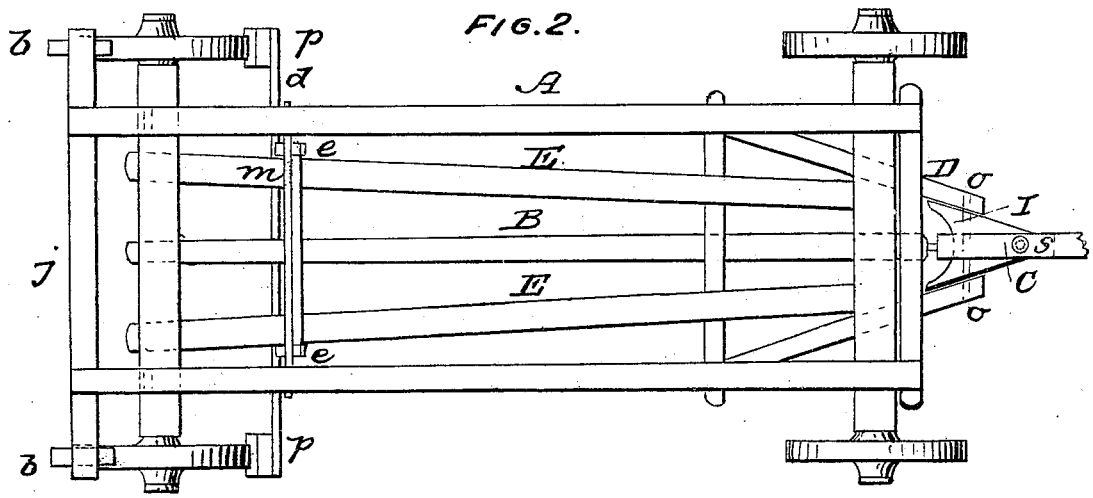
WITNESSES
INVENTOR

United States Patent Office.

O. F. EVANS, OF GUILFORD, NEW YORK.

Letters Patent No. 88,859, dated April 13, 1869.

WAGON-BRAKE.

The Schedule referred to in these Letters Patent and making part of the same.

*To all whom it may concern:*

Be it known that I, O. F. EVANS, of Guilford, in the county of Chenango, and State of New York, have invented a new and useful Improvement in Brakes for Vehicles; and I do hereby declare that the following is a full, clear, and exact description of the same, reference being had to the accompanying drawings, forming a part of this specification, in which—

Figure 1 represents a longitudinal section of a wagon provided with brakes constructed according to my improvement, and Figure 2 represents a plan view of the same.

Similar letters of reference indicate corresponding parts in both figures.

This invention relates to brakes of a self-acting character; and

It consists in the arrangement, between the body and running-gear of a vehicle, of a movable frame, carrying suitable brakes, and operating upon friction-rollers, suitably supported upon the running-gear, whereby the operation of the brake is produced by the weight of the load.

It furthermore consists in the arrangement, in combination with the above, of a sliding reach, in connection with bars and levers, and operated by the draught, whereby the brake is removed from the wheel upon application of the draught.

In order that others may understand the construction and operation of my invention, I will proceed to describe it with reference to the drawings.

A is a frame, mounted upon the running-gear of an ordinary double-perch wagon.

Said frame is composed of timbers bolted or otherwise secured together, in a quadrilateral form, and with its rear extremities projecting over, or beyond the hind wheels, for the purpose of carrying brakes, *b b*.

Said brakes *b b* are preferably of a curvated form, to fit the periphery of the wheel, as shown in the drawing, but may be of any suitable form, and are secured to the extremities of the rear cross-timber *j*, of the frame A, by means of bolts, or otherwise, so as to engage with the rear or hind wheels by the forward moving of the frame A upon the running-gear.

Provision is made for the forward and backward moving of the said frame by means of friction-rollers, *a*.

Said rollers *a* are loosely arranged within excavations, *c*, provided in the upper side of the front and rear bolsters F F, and at suitable points thereon, for supporting the said frame, so that when the wagon is descending a hill, the frame A will roll forward upon the rollers *a*, carrying the brakes *b b* against the hind wheels with a degree of force proportionate to the weight of the load, and declivity of the hill.

The said excavations *c* are upwardly-inclined toward the front, for the purpose of rolling back the rollers *a* and frame A when the vehicle has reached level ground.

B is a sliding reach, arranged to slide longitudinally through bearings provided in the front and rear axles.

Said sliding reach B is connected to the rear extremity of the tongue C, by means of a hook, *f*, so that when the draught is applied the reach is drawn forward, for a purpose hereinafter explained; and is furthermore provided, at its rear end, with an enlargement, or stop, *g*, behind the hind axle, for preventing the entire withdrawing of the said reach when the draught is applied.

The tongue C is constructed of three planks, placed side by side, and bolted, or secured together, a sufficient portion of the length of the inner or central plank being cut away near the rear extremity of the tongue, so as to form a slot thereat, for reception of a loosely-fitting triangularly-shaped block, I.

Said block I is retained within this slot by means of a pin, *s*, passing through the tongue, and is furthermore secured between the front ends of the hounds D, by means of a bolt, *o*, passing horizontally through it and said extremities, whereby the tongue is attached to the hounds.

Provision is made for a longitudinal sliding of the tongue over the triangular block I, by means of a slot, *i*, provided in the latter, and through which slides the pin *s* during the said sliding of the tongue.

*d* is a swinging bar, suspended in a horizontal position by means of rods *h h*, pivoted into the perch-poles E E, and is also connected to the sliding reach B, by means of a connecting rod, *k*, so that the forward and backward sliding of the said reach will cause the forward and backward swinging of the said bar *d*.

*e e* are vertically-arranged levers, pivoted to the upper side of the perch or coupling-poles E E, at a point directly in front of the swinging bar *d*.

Said levers *e e* are connected, at their upper extremities, to the sliding frame A, by means of the engagement of a rod, *m*, of said frame, within notches, *n*, of the levers *e*, as shown in the drawing, or by any other suitable connection, so that the forward sliding of the said frame A will cause the lower extremities of the levers *e e* to press against the front side of the swinging bar *d* with sufficient force to cause, by means of the rod *k*, the backward sliding of the reach B.

The forward sliding of the frame A, occurring only when the vehicle is going down hill, will only act against the sliding reach B at a time when there is no application of the draught to the tongue, but immediately upon the application of the draught, the said sliding reach is drawn forward, so that the swinging bar *d* will engage with the rear side of the lower extremity of the levers *e e*, in such manner as to force backward the frame A, and relieve the wheels from the action of the brakes.

Other brakes, *p p*, may be applied to the extremities of the swinging bar *d*, to engage with the front portion of the hind wheels during the backward forcing of said bar by the forward sliding of said frame A, thereby to brake the wheels more effectually, when desirable.

The sliding reach B, together with its several connections, is more especially designed for freeing the wheels from the action of the brakes when the vehicle is descending hills under circumstances where brakes are not necessary, as, for instance, through snow, or deep mud.

What I claim as my invention, and desire to have secured by Letters Patent, is—

1. The combination of the frame A, brakes b b, and friction-rollers a, as applied to the running-gear of vehicles, substantially as and for the purpose herein set forth.

2. The inclined planes c, on the upper side of the bolsters F F, in combination with the rollers a, for operating, substantially as herein set forth.

3. The sliding reach B, swinging bar d, and levers e e, in combination with the frame A, for relieving the brakes when the draught is applied, substantially as herein described.

4. The tongue C, and hounds D, constructed and arranged as described, in combination with the sliding reach B and levers e, for operating the frame A, substantially as specified.

O. F. EVANS.

Witnesses:
 HENRY T. BROWN,
 D. A. GILBERT.